(12) United States Patent
Reiter et al.

(10) Patent No.: US 6,356,271 B1
(45) Date of Patent: Mar. 12, 2002

(54) COMPUTER GENERATED PAINT STAMP SEAMING COMPENSATION

(75) Inventors: Jesse Chaim Reiter; Jonathan Shekter, both of Toronto (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/024,127

(22) Filed: Feb. 17, 1998

(51) Int. Cl.[7] .............................................. G06T 11/40
(52) U.S. Cl. ...................................................... 345/582
(58) Field of Search ................................ 345/423, 582, 345/665, 664

(56) References Cited

U.S. PATENT DOCUMENTS

| | | | | |
|---|---|---|---|---|
| 5,194,696 A | * | 3/1993 | DiFrancesco | 358/463 |
| 5,381,519 A | * | 1/1995 | Brown et al. | 345/432 |
| 5,751,293 A | * | 5/1998 | Hashimoto et al. | 345/430 |
| 5,764,237 A | * | 6/1998 | Kaneko | 345/430 |
| 5,903,270 A | * | 5/1999 | Gentry et al. | 345/419 |
| 6,075,540 A | * | 6/2000 | Hoppe | 345/419 |

OTHER PUBLICATIONS

Garland et al, "Simplifying Surfaces with Color and Tecture using Quadric Error Metrics", Proceedings of the conference on Visualization, Oct. 1998.*

"Decorating Implicit Surfaces" by Hans Kohling Pederson, Proceedings of the 22nd annual ACM conference on Cpmputer Graphics, pp. 291–300, 1995.*

Jesse Chaim Reiter, "Textured Surface Modeling Using Bezier Triangles", 1996.

News Release—"Alias/Wavefront Brings 3D Paint Technology To Gamers With StudioPaint 3D 4.0", Aug. 6, 1996.

Brochure—Studio Paint 3D—Proven in Production, 1997, Alias/Wavefront.

Abstract From the Collection of Computer Science Bibliographies, Bruce G. Baumgar, "Winged Edge Polyhedron Representation", Technical Report, Stanford University, Dept. of Computer Science, No. CS–TR–72–320, p. 54, Oct. 1972.

* cited by examiner

Primary Examiner—William A. Cuchlinski, Jr.
Assistant Examiner—Thu Nguyen
(74) Attorney, Agent, or Firm—Staas & Halsey LLP

(57) ABSTRACT

A system that applies computer generated paint stamps to a target polygon and to neighboring texture polygons in such a way that each texture polygon affected by a stamp that is too big for the target polygon and that is not connected to the target polygon in texture space receives an appropriately positioned and oriented stamp. The system determines the relative position and orientation of the stamp with respect to a texture polygon adjacent to the target polygon and applies the stamp centered at that relative position and orientation, so that the stamp overlaps the adjacent polygon.

5 Claims, 4 Drawing Sheets

COMPUTER GENERATED PAINT STAMP SEAMING COMPENSATION

CROSS REFERENCE TO RELATED APPLICATION

This application is related to U.S. application Ser. No. 09/024,122 entitled Computer Generated Paint Stamp Compensation having Silicon Graphics, Inc. by Reiter et al, filed concurrently herewith and incorporated by reference herein.

BACKGROUND OF THE INVENTION

1. Field of the Invention

The present invention is directed to the compensation of the electronic paint that an artist can apply to a computer based model and, more particularly, to the compensation of a paint stamp when it exceeds or crosses the boundary of a texture triangle onto which it is applied.

2. Description of the Related Art

Computer generated three dimensional (3D) objects are typically comprised of polygons, typically triangles, of sufficiently small size that the surface of the model appears smooth. Surface detail (color, topology, reflectance, etc.) is applied to these smooth computer generated three-dimensional images by applying painted 2D images, known as textures, to the 3D models in a process called texture mapping. Much of the realism of the models is affected by these textures, and great care is therefore taken to produce the desired effects when painting the textures.

Digital paint is typically applied in brush strokes, with each stroke using a particular paint brush specified by the user. Various attributes of the brush must be specified before the brush can be used to produce a stroke. These attributes include, e.g., the color of paint; the radius, aspect ratio, and rotational angle of the brush; a detailed map specifying the amount of paint to be applied at each point in the brush. The collection of these attributes are called a brush stamp. Once the attributes are set, a digital image of the stamp is created: this is called the stamp image, or a stamp source image. Stamps can then be placed on a target image by copying the stamp image to various locations on the target. Paint brush strokes are typically applied by placing a sequence of consecutive stamps along the trajectory of a path as is indicated by the user with a stylus or mouse pointer. The spacing between the stamps on the path determine the appearance of the stroke. Stamp spacing is typically another attribute specified by the user.

Paint may be applied to 3D models by either painting directly onto the flat texture, or by painting on the model. Although both are useful, only the latter method provides direct visual feedback as to the final appearance of the painted model.

Two methods are conventionally provided for painting in 3D: projective and surface. In projective painting, the paint is applied to a flat surface which is shaded and masked by the model in such a way that the paint appears to be applied directly to the surface. A separate projection step is then necessary to move the paint from this paint plane onto the various textures of the object.

The second 3D painting method is known as painting on the surface. In this approach, paint is applied directly onto the texture assigned to each surface. In particular, brush stamps are applied to the texture in a manner which is consistent with the conventional triangulated surface tessellation of computer based models. Stamps are centered at the world space position designated by the mouse or stylus pointer. That is, given a world space point in the interior of a surface triangle, the corresponding texture space point is found in the interior of the texture triangle assigned to it. The point in texture space is then used as the center of the stamp where it is to be placed. This gives rise to the problem illustrated in FIG. 1. Paint stamps a, b and c are identical in texture-space but quite dissimilar in world-space. When a stamp exceeds the boundary of the texture polygon on which it is applied, as occurs in triangle 12, and the neighboring texture polygon has been assigned a different texture, the stamp will appear chopped off (disconnected) in world space after the texture triangle has been mapped to the corresponding world space triangle, as it appears in world space triangle 14.

What is needed is a method of applying stamps to the texture polygons that eliminates the disconnection.

SUMMARY OF THE INVENTION

It is an object of the present invention to apply paint to world space objects in such a way that disconnected or cutoff stamps do not occur.

The above objects can be attained by a system that applies stamps to neighboring texture polygons in such a way that each texture polygon affected by a stamp that is too big for the target polygon receives a proportional portion of a stamp.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
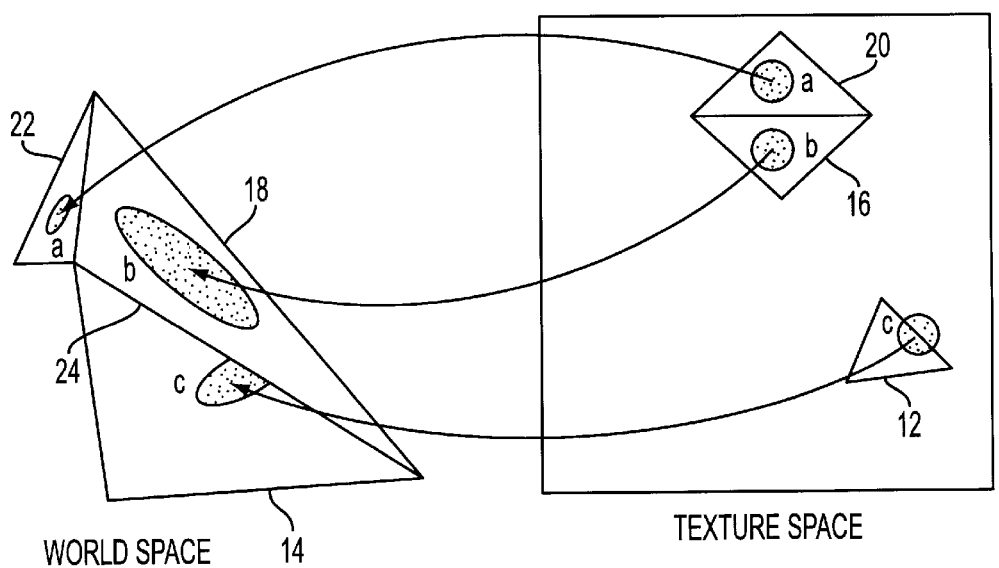
FIG. 1 depicts a paint stamp applied to a texture space polygon which is cutoff when the texture polygon is mapped onto the corresponding world space (3D) polygon.

When two triangles, which are adjacent in world-space (such as triangles 14 and 18 in FIG. 1), and the corresponding texture space triangles are not adjacent in texture-space (such as triangles 12 and 16), the common (world-space) edge 24 is said to have a seam. As illustrated in FIG. 1, stamps that are applied across a seam will appear chopped off in world-space. This problem can be overcome by applying multiple stamps to the texture triangles in a consistent manner, one stamp per each disconnected component.

Figure 2:
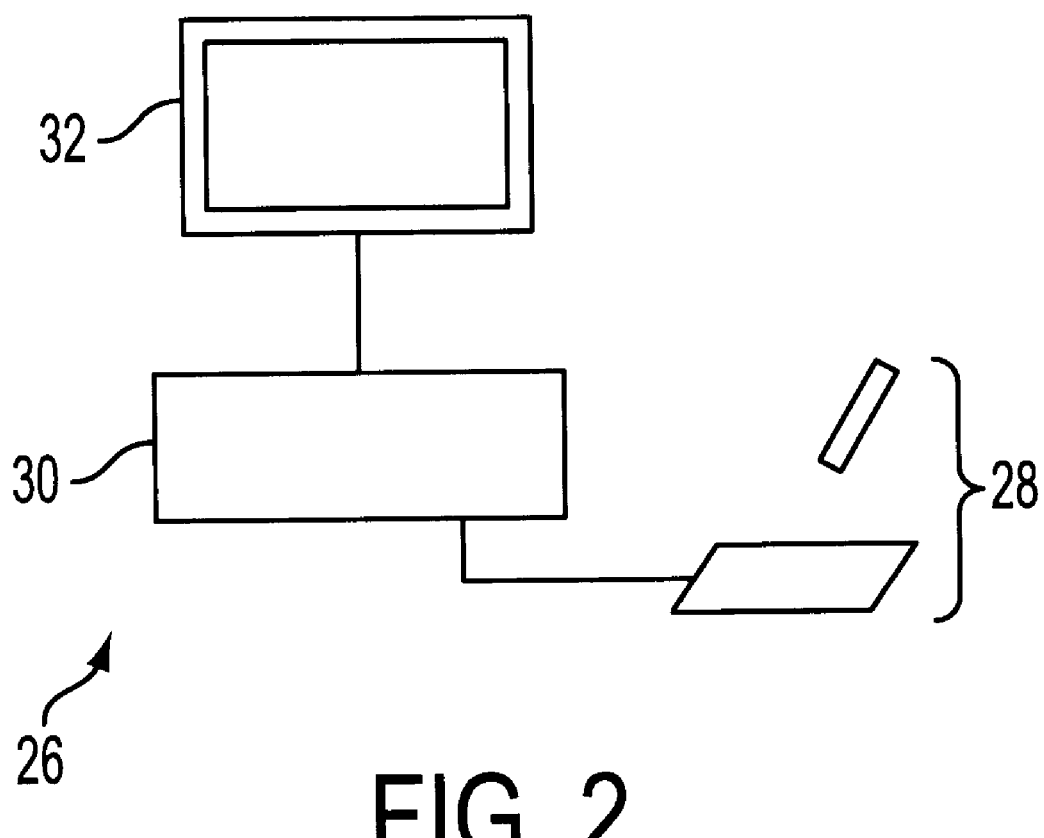
FIG. 2 shows a system according to the present invention.

The present invention is implemented in a computer system 26 as depicted in FIG. 2. An input device 28, such as a stylus and tablet available from WACOM, capable of providing inputs for a paint program is coupled to a computer 30 and display 32, such as an O2 available from Silicon Graphics, Inc. Of course the input device could be other types of devices such as a mouse and the computer could be a personal computer. As the input device 28 is moved, paint is applied to a model displayed on display 32 by computer 30. This paint or the paint stamps are compensated for any lack of adjacency of the texture space triangles and world space triangles used by the system to apply the paint to the model.

To apply multiple stamps to the textures in a consistent manner, one stamp per each disconnected component, a simplified winged edge data structure is constructed using the polygonal mesh (vertices and edges). A winged edge data structure contains the information about all the vertices, edges, and polygons embodying a polygonal mesh, and provides methods of cross referencing the various data. That is, given an edge, the structure can return the two vertices and the two polygons incident on that edge; given a polygon, the structure can return all the edges and vertices incident on it, and; given a vertex, the structure can return all the polygons and all the edges incident on it. The advantage of this structure is that it is indexed by edges so that essentially each edge knows about the two polygons ("wings") incident on it from which it finds the incident vertices. This data structure can take many forms but usually is implemented as a table which is indexed by the edges of the set of polygons.

For each polygon all the edges incident to it are determined and the distances from the polygon centroid to that of each of the polygon's neighbors is determined. For each edge is stored an indication of the two adjacent polygons, and the edge is flagged to indicate the existence of a seam.

A shadow of a stamp is the region of world space in which the stamp appears; a shadow list is a list of polygons lying in the shadow. Given the radius of a compensated stamp, the shadow list can be easily determined from the above winged-edge structure.

Figure 3:
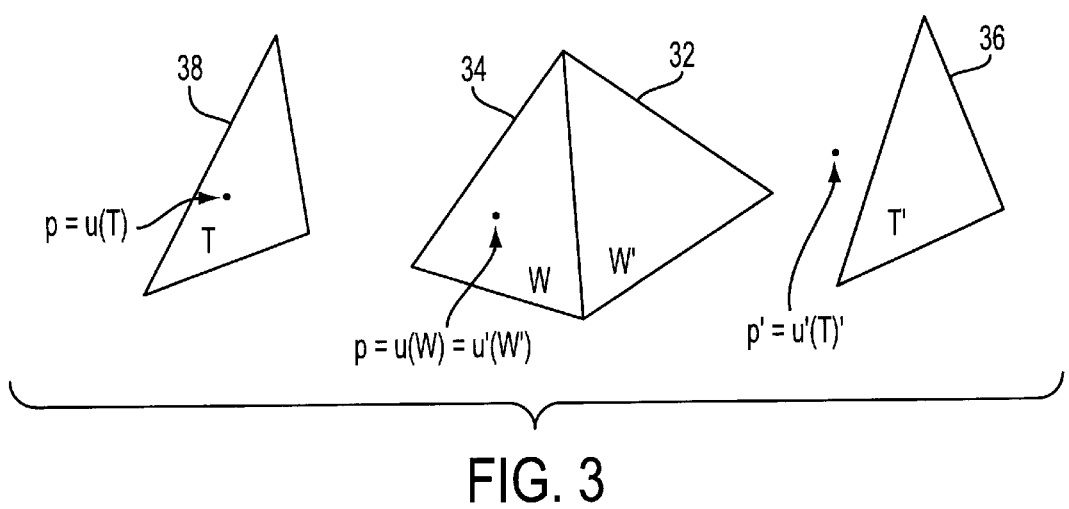
FIG. 3 illustrates how the location for a stamp during seaming compensation is determined.

Given two neighboring world-space triangles W,W' (32 and 34) as depicted in FIG. 3, their corresponding disconnected texture-space triangles T,T' (36 and 38) with a seam existing between the two, and a point p ∈ T, we must find a new point p' ∈ T' that corresponds to p in such a way that the world-space position of p' matches that of p. To find this new point, let (u,v,w) be the barycentric coordinates of p with respect to triangle T, and find p̂ ∈ W, the point with barycentric coordinates (u,v,w) with respect to triangle W. Since W and W' are neighbors, rotate W' around the common edge until the two are coplanar. This places the 3D world space triangles in the same plane which is already the case for the texture space triangles. Then compute (u',v',w'), the barycentric coordinates of p with respect to triangle W'. The desired point p' is the one with barycentric coordinates (u',v',w') with respect to triangle T'.

Seaming artifacts can now be avoided by recursing through the shadow list, applying stamps to selected regions using the following method which will be discussed in more detail with respect to FIG. 4. Given the point p in texture triangle T and the shadow list L:

1. Draw the stamp centered at p and remove T from the shadow list L.
2. Remove from L all polygons adjacent to T whose common edge with T has no seam.
3. Select T as the next triangle in shadow list L, and compute p relative to this new T as described above.
4. Recurse until the shadow list L is exhausted Because of the way in which stamps are placed across edges, the chopped off stamps will line up in world-space to create a full stamp. This method is fairly slow as numerous stamps are drawn for each visible one. The winged-edge structure can therefore be used to determine the distance between the position of a stamp and the nearest seam, and then cull all polygons that are sufficiently distant. Distant stamps would be placed once and avoid the seaming process; the others would be drawn as described.

In an implementation of the invention method described above, the steps are preferably divided into preprocessing steps which occur before paint is applied and while the 3D model is loaded and steps that are performed during painting.

Figure 4:
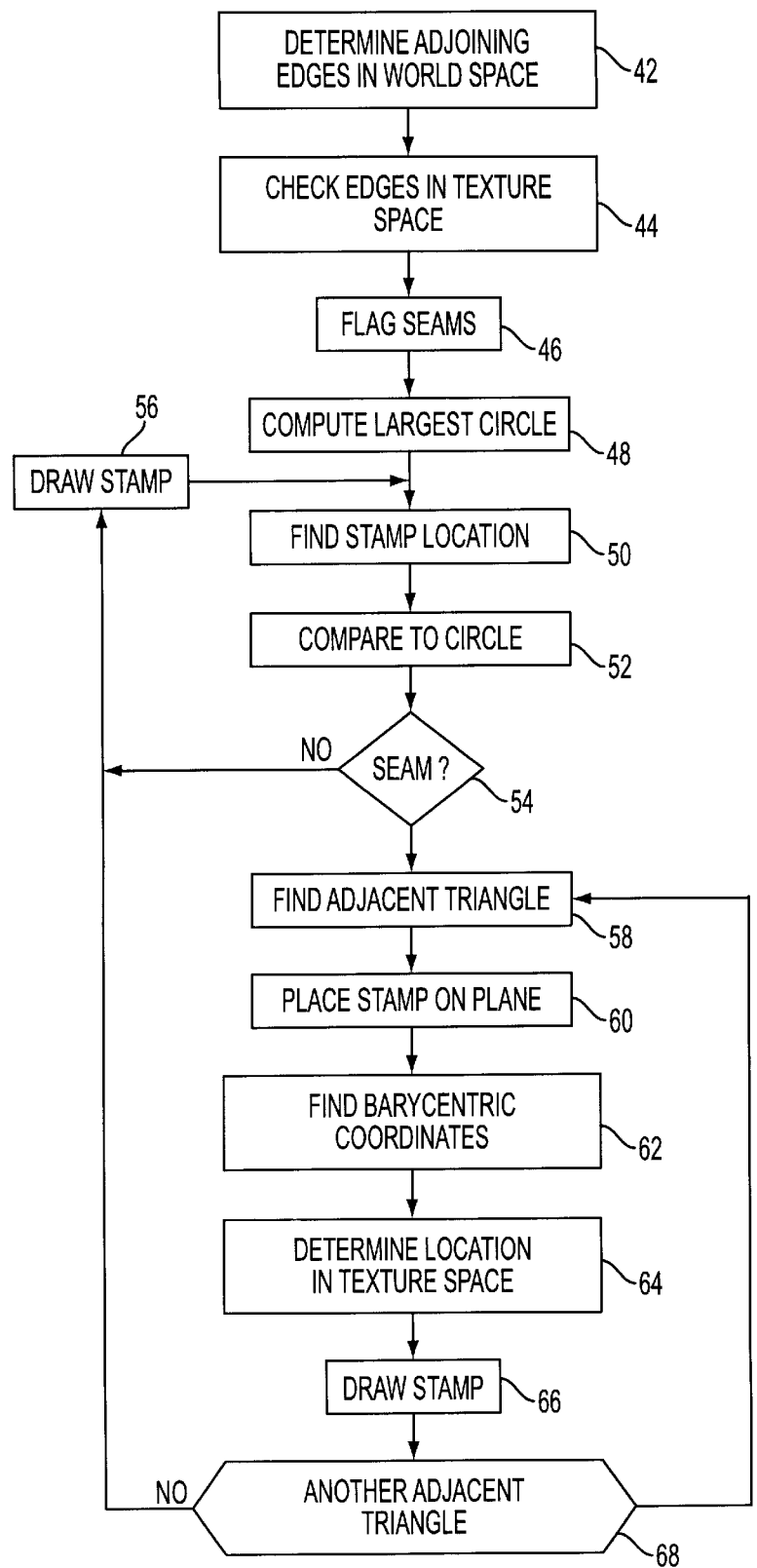
FIG. 4 shows the operations performed during seaming compensation.

The preprocessing steps, as depicted in FIG. 4, start with a list of the triangles of the model and determines 42 all the joining edges of the model in world space by checking the model triangles for two shared vertices. Next, the system determines 44 whether each edge is also a shared edge between corresponding triangles in texture space by checking for the same shared vertices. All shared edges of the model in world space which are not shared in texture space are flagged 46 as seams. Next, a circle is computed 48 for each of the triangles. The circle is the largest circle that will fit within the corresponding triangle. To do this the centroid of each triangle is found; the distance from the centroid to the nearest edge is the radius of the circle. This ends the preprocessing stage.

During painting, the location of the stamp on the model, that is the world space triangle (and the corresponding texture space triangle) where the cursor is located along with the location within the world space triangle (and within the texture space triangle), is found 50. The radius of the stamp at this location is compared 52 to the boundary of the computed circle: if the radius extends beyond the boundary, the stamp extends outside the circle and therefore possibly extends outside the triangle. In this case seaming compensation is performed. If the stamp is completely within the circle, then no seaming compensation need be performed 54 and the stamp is drawn 56 on the texture polygon at the location of the cursor obtained from the input device.

If seaming compensation is necessary the system finds 58 an adjacent triangle by examining the edges of the triangle in which the center of the stamp resides. Next, the stamp is placed 60 on the same plane as the adjacent triangle by rotating the center of the stamp in world space about the adjoining edge. Then, the barycentric coordinates of the center of the stamp with respect to the adjacent triangle in world space are found 62. These coordinates are used in texture space to locate 64 the center of the stamp in texture space relative to the texture space triangle that corresponds to the adjacent world space one by weighting the vertices of the texture space triangle by the factors of the barycentric coordinates. The stamp is then drawn 66 at that location. This location is outside the adjacent texture triangle so only part of the stamp is drawn within the adjacent texture triangle (see the right side of FIG. 3). If another adjacent triangle exists 68 the system returns for another cycle.

The culling of polygons is performed in concert with the seaming process in the following manner. Given a point and a target polygon, the initial stamp is placed at the point and the polygon is marked as having been stamped. Then, the radius of a circle circumscribing the image of the stamp just placed is computed, as described above. The distance between the given point and each edge of the target polygon is now compared to the circumscribing radius. If the distance is no greater than the radius and the edge is flagged as a seam, then the neighboring polygon is in the stamp shadow; otherwise the neighboring polygon is culled. When a polygon is resolved as lying in the shadow and has not yet been stamped, the process is recursed with the neighbor as the target polygon. The process is completed when all the edges of the target polygon have been considered.

The process described above includes finding the polygon that lies under the mouse pointer in order to compute its distortion compensation. This follows the assumption that all polygons along the path of the cursor will be hit. Unfortunately, this may not always be the case as sliver triangles and those with sub-pixel extent may be overlooked by the process and ignored. Fortunately this is not a grave problem, as the process of painting is incremental in nature. The workflow typically consists of painting several strokes, then rotating the object, and painting several more. Textures are often touched up and painted directly regardless of the paint mode. In this way, all the required triangles will eventually get painted. An assumption is also made that all neighboring polygons share common edges, regardless of whether they belong to different surface patches. The algorithm will thus work properly only when the surface contains no cracks. This is an unfortunate limitation considering that not all surface tesselators can maintain a global view of the 3D scene. With global tesselators, however, seaming is handled properly and, therefore, it is preferred that the invention be used with a global tesselator.

The present invention has been described with respect to the texture space and world space tessellations being triangles, however, it is possible for the tessellations to be any shape polygon. The present invention has been described with respect to polygons of three sides, however, the invention will work equally well with polygons of any degree.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A painting process for compensating for a cutoff computer generated paint stamp in a preexisting polygonal 3D model having a preexisting representation in 3D space and a corresponding preexisting representation in texture space, comprising:

determining whether the paint stamp, when applied to a target polygon, will be cutoff in the 3D model by determining whether the paint stamp overlaps a seam in the model, the seam being an edge that is shared between two adjacent polygons in 3D space while the corresponding polygons do not share an edge in texture space;

placing the stamp on the target polygon located where the stamp is to be applied; and applying, if the paint stamp overlaps the seam, relatively located and rotated paint stamps to polygons in texture space corresponding to neighboring polygons joined to the target polygon by the seam in 3D space to compensate for the paint stamp overlapping the seam.

2. A process as recited in claim 1, wherein said determining comprises:

locating the seam by determining whether a world space edge joining a target polygon to a neighbor polygon in world space has a texture space edge joining the corresponding polygons in texture space; and determining whether the paint stamp extends outside the target polygon across the seam.

3. A process as recited in claim 1, wherein said applying comprises:

placing the stamp in a plane of the neighboring polygons;

determining barycentric coordinates of the stamp with respect to the neighboring polygons in 3D space, and using the barycentric coordinates to determine coordinates of the stamp in texture space; and placing the stamp in texture space at the texture space coordinates.

4. A process of compensating a computer generated paint stamp, comprising:

creating a shadow list of polygons lying in a shadow of the stamp;

drawing the stamp at a desired location in a target polygon in texture space;

removing the target polygon from the shadow list;

removing all remaining polygons from the shadow list that do not form a seam with the target polygon, the seam being an edge that is shared between two adjacent polygons in 3D space while the corresponding polygons do not share an edge in texture space;

determining the next polygon in the shadow list;

determining a position of the stamp with respect to the next polygon in texture space; and drawing the stamp at the position.

5. A process for compensating a computer generated paint stamp applied to a target polygon in a polygonal model, comprising:

locating edges of the target polygon which join the target polygon to neighboring polygons in world space;

determining whether the edges are seams, the seams being edges that are shared between two adjacent polygons in world space while the corresponding polygons do not share an edge in texture space;

computing a largest circle which will fit within the target polygon;

comparing a radius of the stamp to the boundary of the circle at an intended location to determine if the radius of the stamp extends beyond the boundary of the circle and across the seam such that the stamp appears cutoff on the model in 3D space;

determining, if the radius of the stamp extends beyond the boundary of the circle and across the seam, barycentric coordinates of the stamp with respect to the neighboring polygons in 3D space;

using the barycentric coordinates to determine a corresponding location in texture space; and applying the stamp in texture space at the corresponding location to compensate for the paint stamp appearing cutoff when it crosses the seam.

* * * * *

UNITED STATES PATENT AND TRADEMARK OFFICE
CERTIFICATE OF CORRECTION

PATENT NO.     : 6,356,271 B1                                        Page 1 of 1
DATED          : March 12, 2002
INVENTOR(S)    : Jesse C. Reiter et al.

It is certified that error appears in the above-identified patent and that said Letters Patent is hereby corrected as shown below:

Title page,
Item [56], References Cited, delete "5,194,696, and insert -- 5,194,969 --;
Item [56], OTHER PUBLICATIONS,
Delete "Cpm-puter", and insert -- Computer --
Delete "Tecture", and insert -- Texture --

Column 3,
Line 43, delete "p", and insert --p̂--

Signed and Sealed this

Seventeenth Day of September, 2002

Attest:

JAMES E. ROGAN
Attesting Officer    Director of the United States Patent and Trademark Office